US009752671B2

(12) United States Patent
Kampe et al.

(10) Patent No.: US 9,752,671 B2
(45) Date of Patent: Sep. 5, 2017

(54) TRANSFER CASE—METHOD OF CONTROLLING LUBRICATION—ECO—MODE OPERATION

(71) Applicant: BorgWarner Inc., Auburn Hills, MI (US)

(72) Inventors: Daniel Kampe, Orkelljunga (SE); Johan Nilsson, Malmoe (SE); Philip J. Francis, Lapeer, MI (US); Garrett W. Gage, Metamora, MI (US); Michael F. Boyer, Sterling Heights, MI (US)

(73) Assignee: BorgWarner Inc., Auburn Hills, MI (US)

(*) Notice: Subject to any disclaimer, the term of this patent is extended or adjusted under 35 U.S.C. 154(b) by 211 days.

(21) Appl. No.: 14/625,770

(22) Filed: Feb. 19, 2015

(65) Prior Publication Data
US 2015/0240935 A1 Aug. 27, 2015

Related U.S. Application Data

(60) Provisional application No. 61/942,982, filed on Feb. 21, 2014.

(51) Int. Cl.
F16H 57/04 (2010.01)

(52) U.S. Cl.
CPC ....... *F16H 57/0409* (2013.01); *F16H 57/045* (2013.01); *F16H 57/0424* (2013.01); *F16H 57/0461* (2013.01); *F16H 57/0473* (2013.01); *F16H 57/0489* (2013.01)

(58) Field of Classification Search
CPC . B60K 17/344; F16H 57/045; F16H 57/0483; F16H 57/05; Y10T 74/19991

USPC .......................................... 474/91; 184/6.12
See application file for complete search history.

(56) References Cited

U.S. PATENT DOCUMENTS

| 3,505,904 | A | | 4/1970 | Williams, Jr. |
| 3,601,515 | A | | 8/1971 | Pelizzoni |
| 3,943,798 | A | | 3/1976 | Sato |
| 4,086,826 | A | | 5/1978 | von Kaler |
| 4,147,242 | A | * | 4/1979 | Fujioka ............... F16H 57/0412 192/113.35 |
| 4,238,929 | A | * | 12/1980 | Fujioka .................. F16H 57/04 192/221 |
| 4,299,140 | A | | 11/1981 | Kako et al. |

(Continued)

FOREIGN PATENT DOCUMENTS

| AT | 007 700 U1 | 7/2005 |
| DE | 3600871 | 7/1987 |

(Continued)

*Primary Examiner* — Henry Liu
(74) *Attorney, Agent, or Firm* — Warn Partners, P.C.

(57) ABSTRACT

A transfer case is provided with a primary shaft which is selectively engagable with a secondary shaft via a clutch mechanism. The clutch mechanism is inclusive of a friction pack. A hub of the clutch mechanism is connected on the primary shaft and the clutch housing is torsionally fixed with a primary sprocket rotatively mounted on the primary shaft. A passive or active controlled lubricant collection receptacle is provided which maximize fluid retention in conditions wherein there is not a high demand of torque for the clutch system of the transfer case thereby minimizing fluid that is unnecessarily churned by engagement with the hub connected with the secondary shaft.

13 Claims, 13 Drawing Sheets

(56) References Cited

U.S. PATENT DOCUMENTS

| | | | |
|---|---|---|---|
| 4,346,622 A | 8/1982 | Pierce | |
| 4,414,861 A | 11/1983 | Witt | |
| 4,422,349 A * | 12/1983 | Matsumoto | B60K 17/344 180/247 |
| 4,462,271 A | 7/1984 | Stieg | |
| 4,543,854 A | 10/1985 | Roth | |
| 4,549,447 A | 10/1985 | Sakakibara | |
| 4,573,373 A | 3/1986 | Shimizu et al. | |
| 4,699,249 A * | 10/1987 | Fujiura | B60K 17/344 184/11.1 |
| 4,841,803 A * | 6/1989 | Hamano | B60K 17/344 180/247 |
| 4,914,968 A | 4/1990 | Diermeier et al. | |
| 5,334,116 A * | 8/1994 | Baxter, Jr. | B60K 17/344 180/248 |
| 5,456,129 A | 10/1995 | Tane et al. | |
| 5,667,036 A * | 9/1997 | Mueller | F16H 57/0493 184/11.1 |
| 5,704,863 A * | 1/1998 | Zalewski | B60K 17/344 180/247 |
| 5,873,440 A | 2/1999 | Godfrey et al. | |
| 5,954,612 A | 9/1999 | Baxter, Jr. | |
| 6,516,789 B1 | 2/2003 | Jones | |
| 6,582,331 B1 | 6/2003 | Baxter, Jr. | |
| 6,865,970 B1 * | 3/2005 | Baxter, Jr. | B60K 17/344 74/606 R |
| 7,025,701 B2 * | 4/2006 | Cui | F16H 57/0483 475/159 |
| 7,252,616 B2 | 8/2007 | Wormsbaecher | |
| 7,713,158 B2 * | 5/2010 | Gassmann | B60K 17/346 475/213 |
| 7,753,173 B2 * | 7/2010 | Gratzer | B60K 17/344 184/13.1 |
| 7,841,449 B2 * | 11/2010 | Nakamura | F16H 57/0447 184/6.12 |
| 7,984,791 B2 * | 7/2011 | Taguchi | F16H 57/0483 184/11.1 |
| 8,650,980 B2 * | 2/2014 | Lafer | B60K 17/344 74/467 |
| 8,776,950 B2 * | 7/2014 | Quehenberger | B60K 17/02 184/6.12 |
| 8,919,500 B1 * | 12/2014 | Kilcrease | F01M 9/06 184/11.5 |
| 9,366,334 B2 * | 6/2016 | Pritchard | F16H 57/0456 |
| 2001/0011616 A1 * | 8/2001 | Kageyama | F16H 3/66 184/6.12 |
| 2005/0098386 A1 * | 5/2005 | Allen | F16H 57/0434 184/6.12 |
| 2005/0101431 A1 | 5/2005 | Allen et al. | |
| 2009/0143182 A1 | 6/2009 | Thomas et al. | |
| 2009/0235781 A1 | 9/2009 | Quehenberger et al. | |
| 2013/0190114 A1 * | 7/2013 | Neumeister | F16H 57/0409 474/93 |
| 2014/0094333 A1 * | 4/2014 | Ebner | F16H 57/05 474/91 |
| 2014/0116807 A1 * | 5/2014 | Paielli | F16H 57/045 184/6.12 |
| 2015/0060228 A1 * | 3/2015 | Francis | F16H 57/0473 192/113.5 |

FOREIGN PATENT DOCUMENTS

| | | |
|---|---|---|
| DE | 19544322 | 6/1996 |
| DE | 10116455 | 10/2001 |
| EP | 0477767 | 4/1992 |
| EP | 0490548 | 6/1992 |
| EP | 0268904 | 6/1998 |
| FR | 2759132 | 8/1998 |
| GB | 458379 | 9/1935 |
| JP | 59-208265 | 11/1984 |
| SU | 983361 | 12/1982 |
| WO | 2004092639 | 10/2004 |
| WO | 2005115790 | 12/2005 |
| WO | 2006015394 | 2/2006 |

\* cited by examiner

TRANSFER CASE—METHOD OF CONTROLLING LUBRICATION—ECO— MODE OPERATION

FIELD OF THE INVENTION

The present invention relates to transfer cases for automotive vehicles. In particular, the field of the present invention is for transfer cases for selective on demand four wheel drive vehicles with particular application for vehicles having normal rear wheel drive with longitudinally mounted engines.

BACKGROUND OF THE INVENTION

Most rear wheel drive vehicles which are selectively engagable to be all wheel drive vehicles have a transfer case. The transfer case typically has a primary shaft which is connected to the output of a vehicle transmission. The primary shaft typically rotatably mounts a sprocket that engages a chain. The chain typically engages with another sprocket that is typically connected with a secondary shaft. The secondary shaft is rotatably mounted within the transfer case. The secondary shaft is torsionally connected with a front drive shaft that is torsionally connected with a front differential to power front wheels of the vehicle. To provide a function of selectively engaging the front wheels of the vehicle, there is provided a clutch mechanism that selectively engages the sprocket on the primary shaft with the primary shaft to transfer torque from the primary shaft to the secondary shaft thereby selectively engaging the front wheels of the vehicle. When ideal pavement conditions exist, typically the clutch will not be engaged so that the transmission only torsionally engages the rear wheels of the vehicle. A controller is typically provided which is cognizant of wheel slip conditions to automatically control the engagement of the clutch. In some four wheel drive embodiments, the clutch can also be engaged as a result of operator demand.

In many transfer cases, in the two wheel drive mode of operation, the secondary shaft will still rotate due to the movement of the non-powered (in most cases front) wheels. This condition exists even when the clutch is non-engaged and no torque transfer is occurring to the secondary shaft.

Most transfer cases have some type of lubricant pump to provide lubrication for the clutch in its associated friction pack, the shafts, bearings, sprockets and chain. The operation of this pump provides a load on the vehicle engine either mechanically by being powered by the take off from the vehicle drive train or is a load upon the engine indirectly by generating a parasitic electrical load. It is desirable to provide a transfer case wherein the lubrication needs can be provided in a more passive manner from the operation of the transfer case.

It is desirable that the amount of lubricant within the transfer case which is exposed to churning by the secondary sprocket be as little as possible to avoid foaming the lubricant and the generation of heat within the lubricant. The above provides higher efficiency of the transfer case when churning of the oil is reduced or minimized. It is desirable to provide a transfer case which maximizes lubricant capacity, minimizes the distance from the sprocket wheel to the bottom of the transfer case and additionally minimizes the amount of fluid exposed to the secondary sprocket during two wheel drive operation or high speed four wheel drive operation wherein there is low torque demands for the wheels connected to the differential connected with the secondary shaft.

SUMMARY OF THE INVENTION

To meet the above noted desires and to provide other manifold advantages, a revelation of the present invention is brought forth. The present invention in one of its embodiments provides a transfer case with a primary shaft that is selectively engagable with a secondary shaft via a clutch mechanism. The clutch mechanism is inclusive of a friction pack. A hub of the clutch mechanism is connected on the primary shaft and the clutch housing is torsionally fixed with a primary sprocket rotatively mounted on the primary shaft. The transfer case has a lubricant collection receptacle located remotely from a sump underneath the secondary shaft which allows for more lubricant to be stored within the transfer case. Since the receptacle is located away from the sump therefore less lubricant is exposed to the secondary sprocket when the vehicle is in a two wheel drive mode or a high speed four wheel drive mode with low torque demand for the wheels of the vehicle torsionally connected with the secondary shaft.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figures 1, 5:
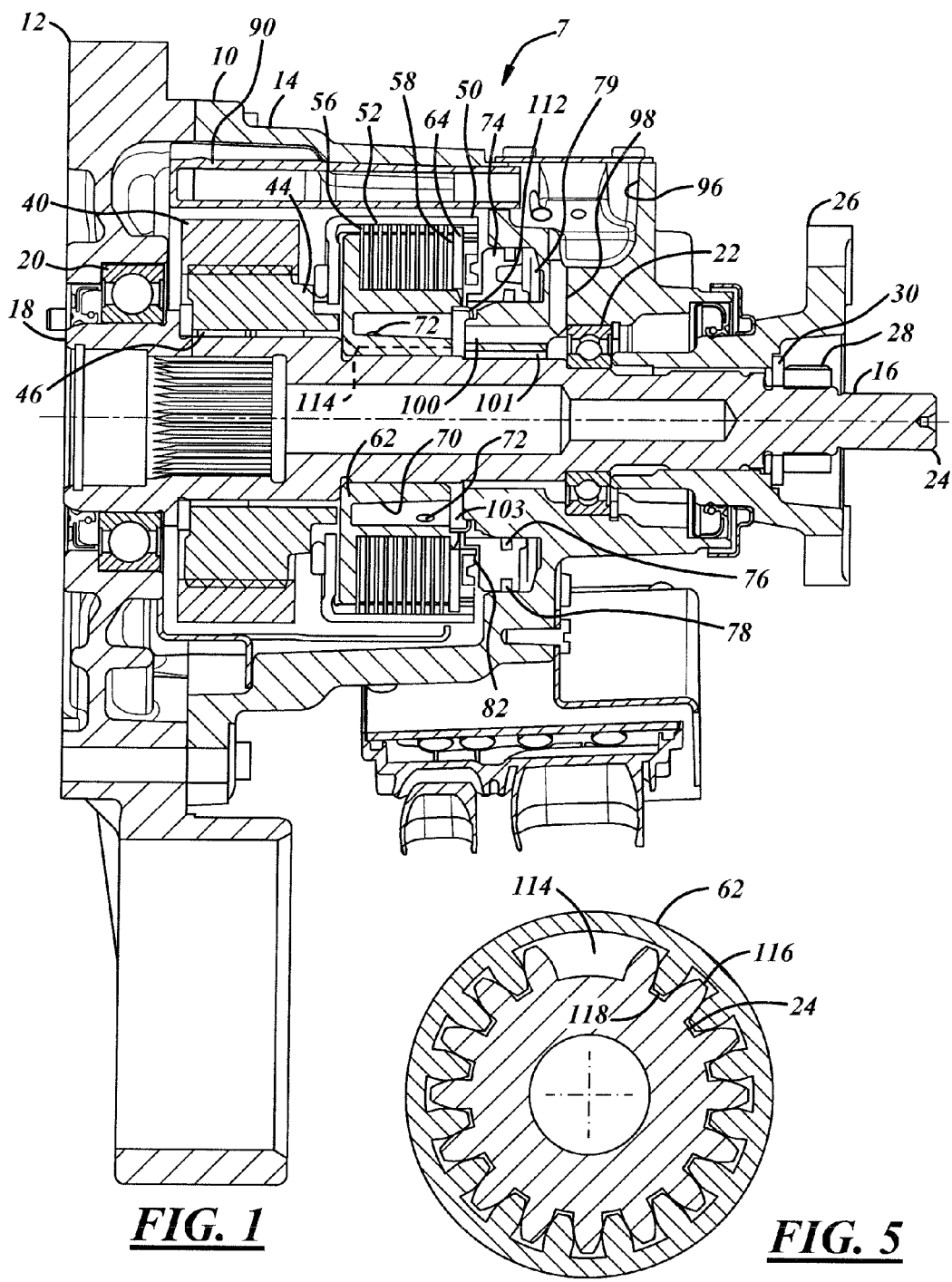
FIG. 1 is a sectional view of a transfer case.
FIG. 5 is a partial sectional view illustrating a lubrication path extending between the hub and a primary shaft of the transfer case shown in FIGS. 1-4.
Figure 2:
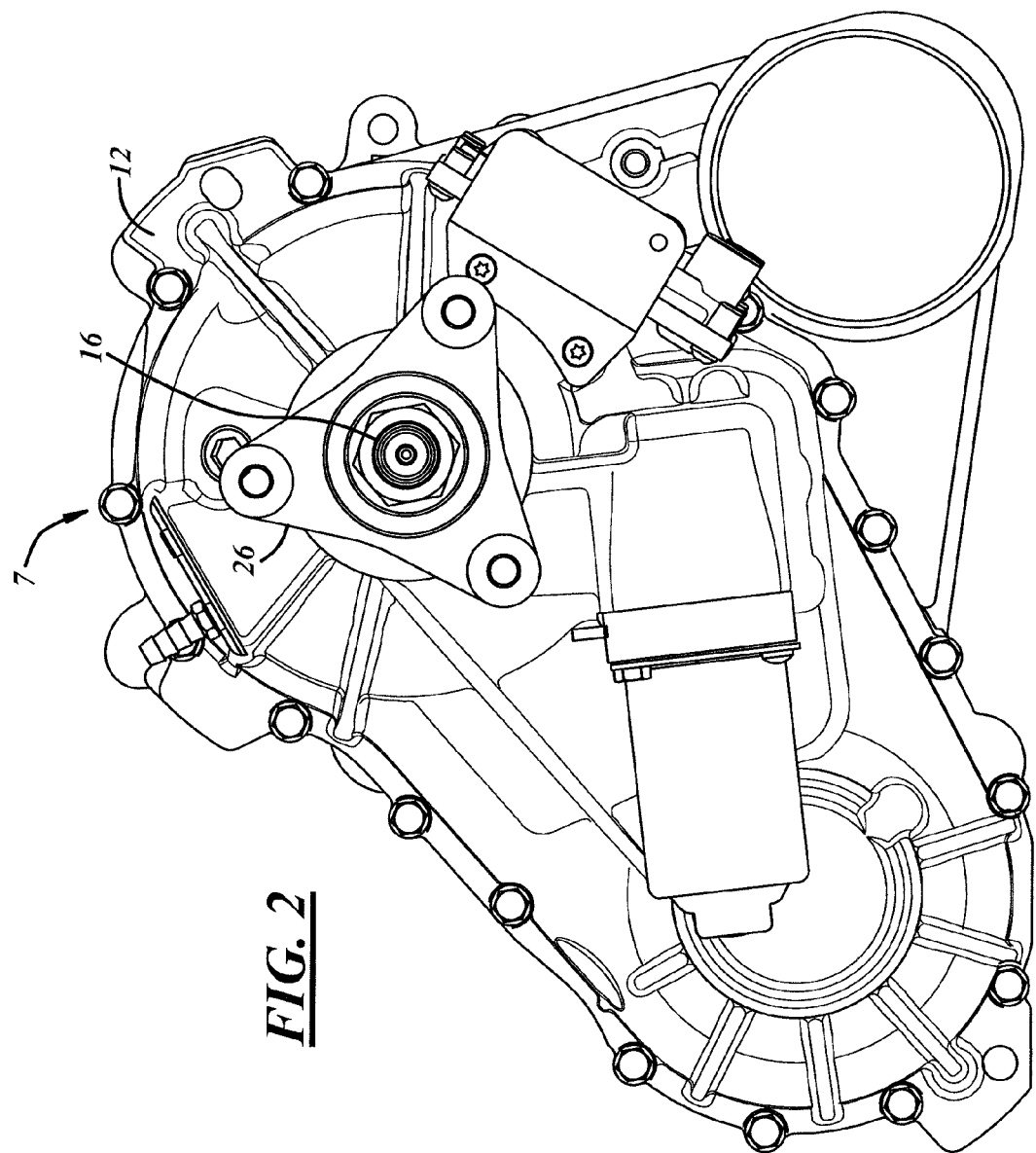
FIG. 2 is a rear elevational view of the transfer case shown in FIG. 1.
Figure 3:
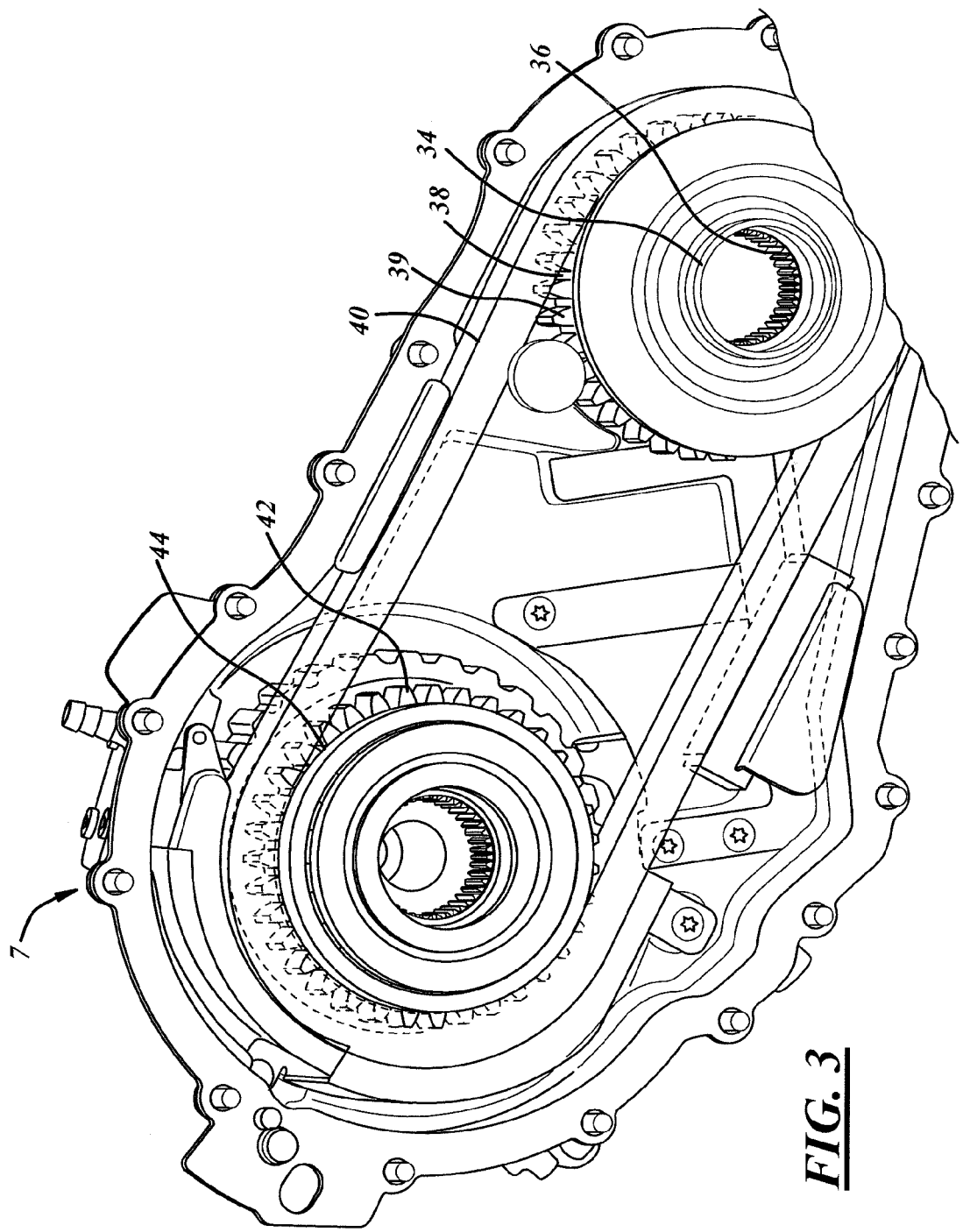
FIG. 3 is a front perspective view of the transfer case shown in FIGS. 1 and 2 with a front cover plate removed.
Figure 4:
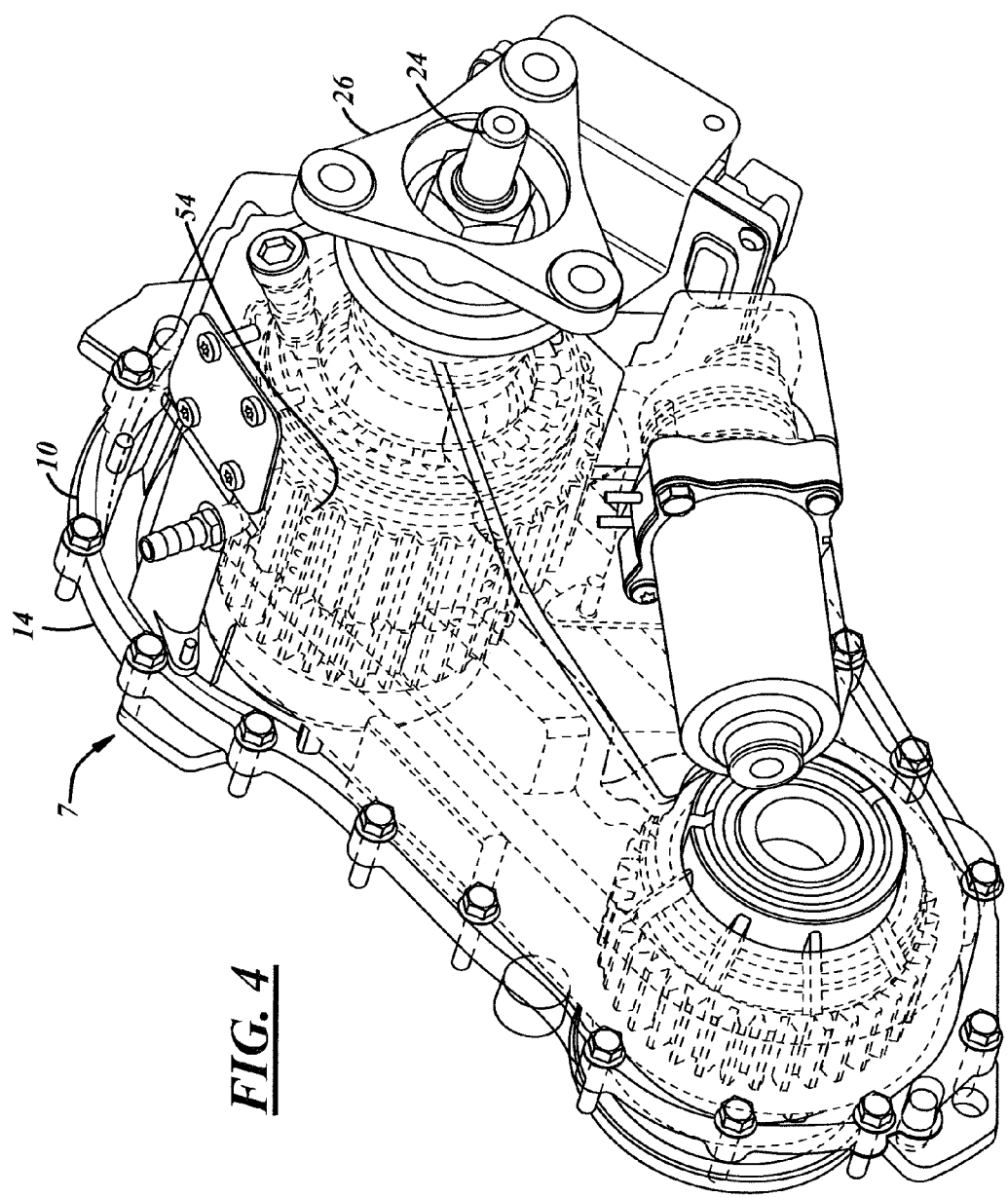
FIG. 4 is a rear perspective view with portions of the transfer case shown phantom in FIGS. 1-3.

The following description of the preferred embodiment(s) is merely exemplary in nature and is in no way intended to limit the invention, its application, or uses.

Referring to FIGS. 1-5, an example of a transfer case 7 is provided. The transfer case 7 has a housing 10. The housing 10 has a front cover plate 12 which is boltably connected to a main body 14. Rotatably mounted within the transfer case housing 10 is a primary shaft 16. The primary shaft 16 has a front end 18 conformed to connect with an output shaft (not shown) of a transmission of the vehicle. Typically, the vehicle will be a rear wheel drive vehicle with a longitudinally mounted engine. The drive train for the vehicle is configured in such a way that power can be selectively diverted from the rear axle to be shared with the front axle to provide the vehicle with all wheel drive capabilities. The primary shaft is mounted to the front cover plate 12 by a front bearing 20. A rearward portion of the primary axle 16 is rotatably mounted within the housing main body 14 by a rear bearing 22. A rear end 24 of the primary shaft is connected with a yoke 26 by a nut 28 which captures a washer 30. The yoke 26 is connected with a drive line extending to a vehicle rear differential and axle (not shown).

At a lower elevation, the transfer case 7 also rotatably mounts a secondary shaft 34. The secondary shaft 34 is configured to have in its inner diameter splined teeth 36 to allow the secondary shaft 34 to power either directly or via a universal type joint, a front drive line shaft (not shown) that is torsionally connected with a differential for front wheels of the vehicle. In another embodiment (not shown), the secondary shaft can be connected with a front wheel drive line via a flange connection. An exterior of the secondary shaft is a connected sprocket 38 provided with a series of sprocket teeth 39. The sprocket teeth 39 engage a flexible torsional force transfer member or a belt 40 (shown schematically) which is typically provided by a multi-link chain. The belt 40 is engaged with sprocket teeth 42 provided on the engagement wheel or primary sprocket 44. The primary sprocket 44 is rotatably mounted on the primary shaft 16 by needle bearings 46. In other embodiments (not shown), the primary sprocket can instead be a gear in direct or indirect gear connection with the secondary shaft.

To allow the primary shaft 16 to selectively torsionally engage the secondary shaft 36, there is provided a clutch 50. The clutch 50 includes a clutch housing 52. The clutch housing 52 is torsionally fixably connected with the primary shaft sprocket 44. The clutch housing 52 has a series of radial folds 54 which provide radially inward projecting teeth which engage with correspondingly shaped radial edges of friction discs 56. The friction discs 56 are intermingled with corresponding friction plates 58. The friction plates 58 along their inner diameter have a gear tooth type profile to allow them to be torsionally connected with a hub 62 having radially outward corresponding folds. The hub 62 is torsionally affixed with the primary shaft 16 by weld, spline or shrink fit arrangement. A backing plate 64 is also provided. The backing plate 64, as well as friction plates 58 and friction discs 56, form a friction pack to allow for selective connection of the clutch housing 52 with the clutch hub 62 thereby causing the sprocket 44 to be joined with the primary shaft 16.

The hub 62 has a multiple series of lubrication axial extending passages 70. The axial passages 70 are intersected with radially outward projecting lubrication holes passages 72 which deliver lubricant to the friction pack. To selectively engage the friction pack, there is provided a piston 74. The piston 74 has a radially inner seal 76 and a radially outer seal 78. Axially behind the piston 74 is a pressurizable chamber 79 which is connected by a passage (not shown) with a source of pressurized fluid (not shown). When actuated, the piston 74 engages a bearing 82 which is adjacent to the backing plate 64 to engage this friction pack thereby torsionally connecting the hub 62 and primary shaft 16 with the sprocket 44, belt 40 and secondary shaft 34 to torsionally power the front wheels of the vehicle.

When torque to the front wheels is required, there is need for lubricant to be delivered to the clutch pack primarily for cooling the friction pack. Lubricant is also delivered to the belt 40 and the sprockets 44 and to the secondary shaft 36.

As the chain moves, lubricant oil is splashed. Much of the oil is splashed into a reservoir system that includes collection baffle 90 having an entrance 92 generally adjacent the primary sprocket 44. The momentum of the lubricant oil causes the lubricant to be transported in an axial direction above the primary shaft 16 and above axially overlapping the piston 74 the clutch 50 and its associated friction pack. The lubricant is then collected in a lubricant collective receptacle 96. The fluid receptacle 96 is formed in the body 14 of the housing. The receptacle 96 is stationary. The collection of oil develops a pressure head which enters a stationary housing vertical passage 98. The vertical passage 98 intersects with the rear bearing 22 to lubricate the same. Intersecting the vertical passage 98 is a stationary housing generally axial passage 100. Thus the flow of oil is additionally radially inward of the friction pack. Axial passage 100 allows the oil under the pressure heads supplied by the reservoir to travel axially in a generally forward direction flow into an axial extending lubricant passage 70 provided in the hub. One factor which enhances the performance of the lubrication provided by the present invention is that when the lubricant is being transported vertically inward through passage 98 there are no rotating member which it must pass. Oil entering the axial lubrication passage 70, then through rotation, the oil is urged radially outward through lubrication holes 72 to lubricate the friction pack.

Radially inward of the lubrication passage 100 is an inner lubrication passage 101. Inner lubrication passage 101 intersects with a disc shaped space 103. The disc shaped space 103 is bordered by a path restriction 112 which prevents lubrication oil from being flung outward to piston 74. The primary shaft 24 is splined to the hub 62 by a series of radially outward extending teeth 116 interacting with radially inward extending teeth 118 of the hub. One or more of the teeth 116 or 118 are deleted to provide a lubrication passage 114 which extends between the interface of the hub and a primary shaft allowing lubricant to flow from the rear of the hub to the front of the hub and thereby reach needle bearings 46 which rotatively mount the primary sprocket 44 to the primary shaft.

Figure 6:
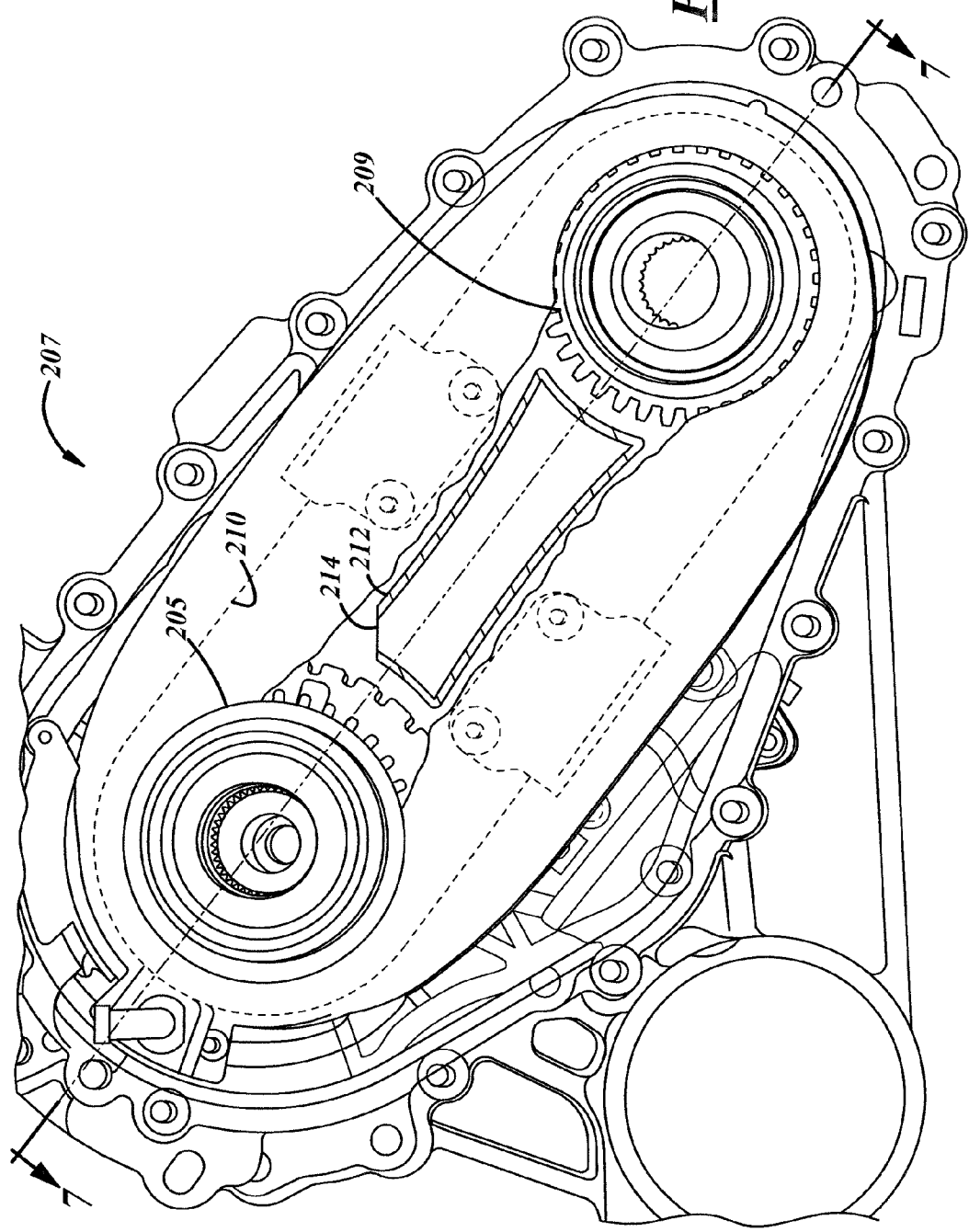
FIG. 6 is a view of a transfer case functionally similar to that shown in FIGS. 1-5 providing a lubricant collection receptacle in the loop of the belt which torsionally connects sprockets provided on the primary and secondary shafts of the transfer case.
Figure 7:
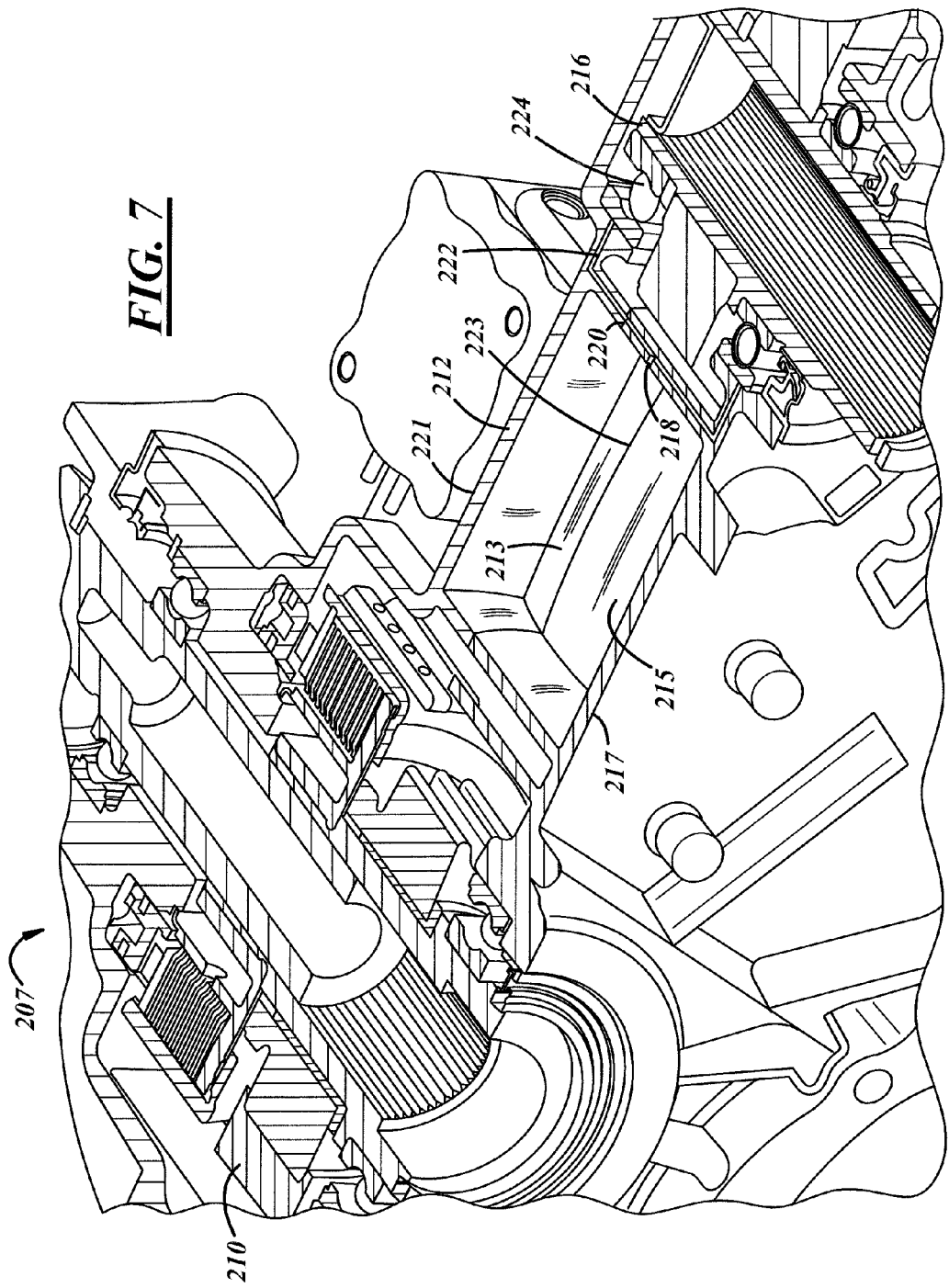
FIG. 7 is a section view taken along lines 7-7 of FIG. 6.

Referring to FIGS. 6 and 7, a transfer case 207, having almost identical function and structure to previously described transfer case 7, is provided. In transfer case 207, between a loop of the belt or chain 210 provided is an auxiliary reservoir or lubricant collection receptacle 212. The receptacle 212 is formed by walls 213 and 215 which project from a front portion 217 of the housing and a rear portion 221 of the housing meeting along a line 223. The collection receptacle 212 has an opening 214. The opening 214 allows the collection receptacle 212 to gravitationally capture lubricant that is splashed by the primary and secondary sprockets 205, 209 and chain 210. Adjacent the collection receptacle 212 in towards the secondary shaft 216, the receptacle has a molded or drilled passage 218. Passage 218 intersects a cross passage 220 (as shown molded, but can be cross bore plugged at extreme ends) and longitudinal passages 222 (as shown molded, but can be blind bores) to provide a path for lubricant within collection receptacle 212 to lubricate the bearings 224 of the secondary shaft in a passive manner. If the secondary shaft is powering the front wheels when the vehicle is at a high rate of speed, lubricant will tend to collect within the collection receptacle 212 faster than it leaks through the passage 218 to lubricate the secondary shaft bearings thereby in a passive manner automatically remove or store lubricant away from the sump which is underneath the secondary shaft 216. The lubricant collection receptacle 212 can be designed in certain applications to hold 20% or more of the total lubricant capacity of the transfer case is desired. This removal of lubricant from an area adjacent to the shaft 216 in its connected sprocket 226 causes a reduction of churning of the lubricant resulting reducing any foaming or heat generation and increasing transfer case efficiency.

Figure 8:
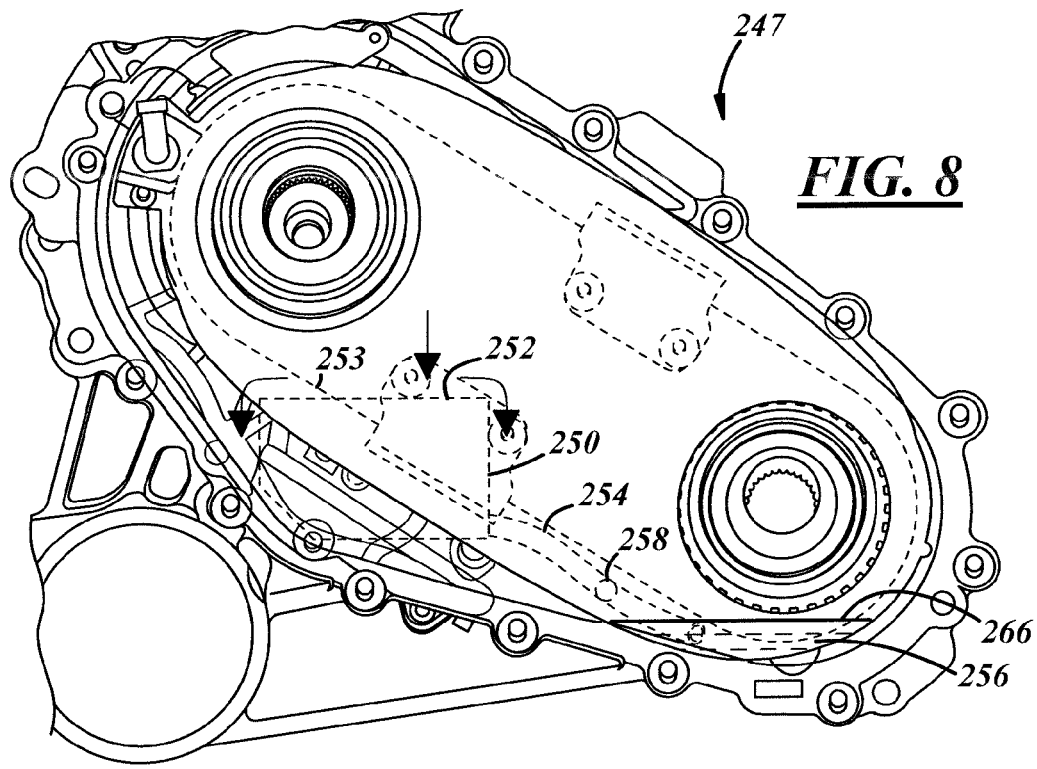
FIG. 8 is a view similar to that of FIG. 6 of an alternate preferred embodiment transfer case according to the present invention having an actively controlled lubricant collection receptacle according to the present invention.
Figure 9:
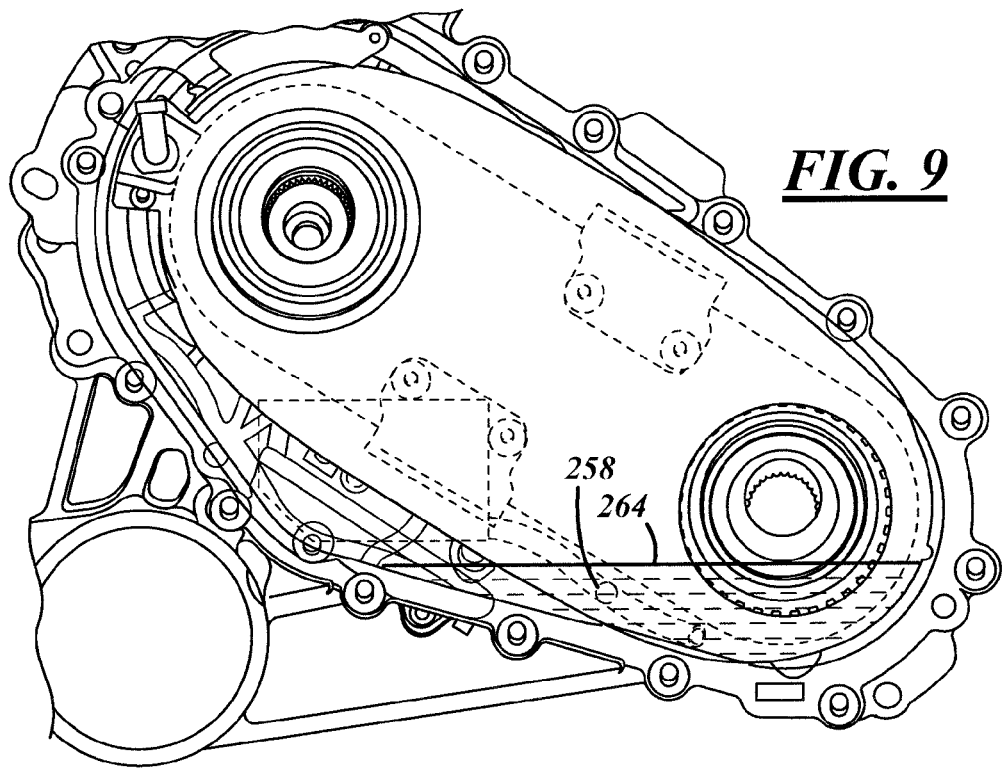
FIG. 9 is a view similar to that of FIG. 8 illustrating operation of the actively controlled fluid collective receptacle of the transfer case shown in FIG. 8.
Figure 10:
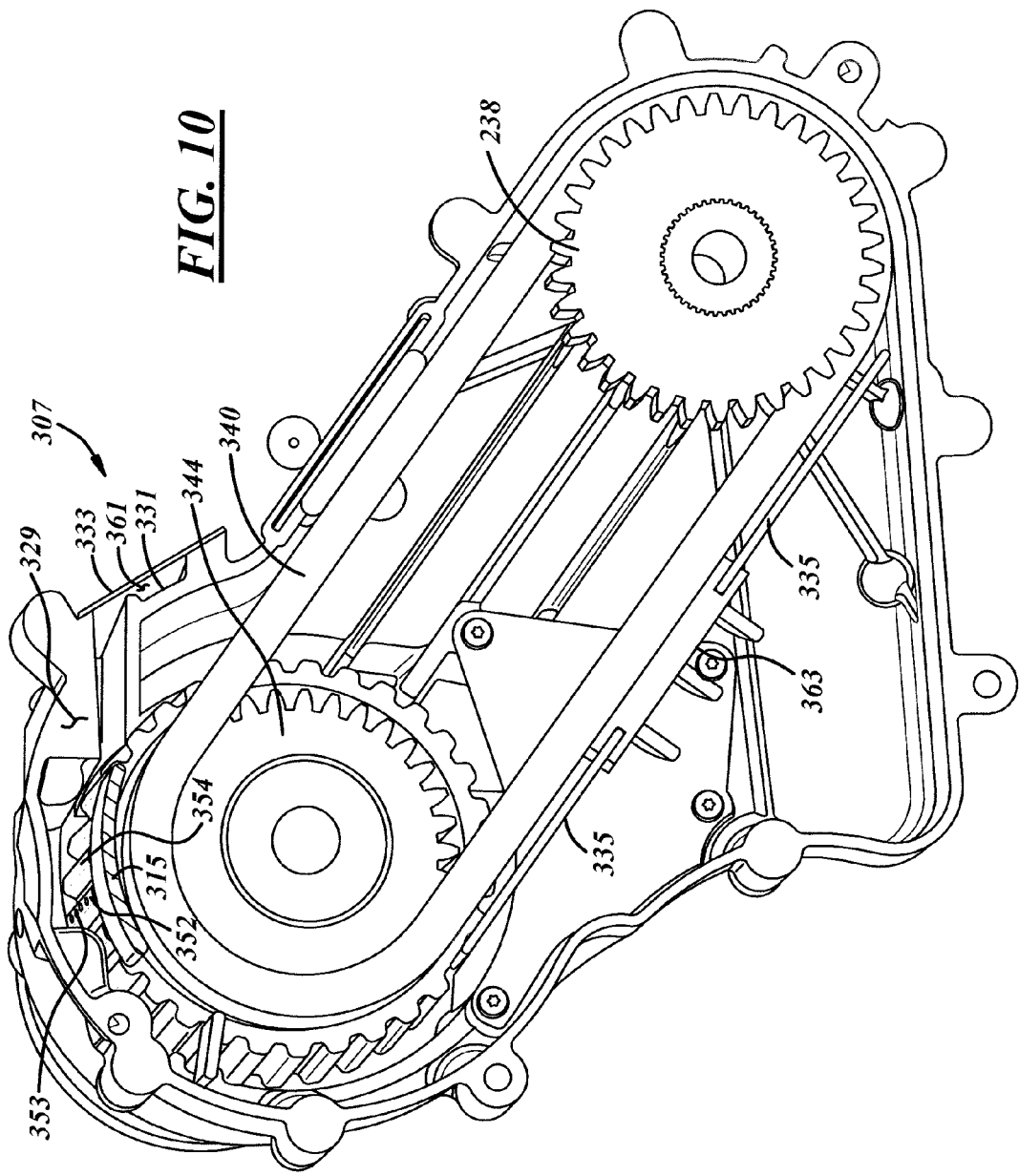
FIG. 10 is a view similar to that of FIG. 3 of an alternate preferred embodiment transfer case according to the present invention having a passively hydraulically actuated valve controlling fluid communication between a lubricant collection receptacle and a friction pack interface between a hub and a clutch housing of a clutch utilized to selectively connect a sprocket on a primary shaft with the sprocket on a secondary shaft according to an alternate preferred embodiment of the present invention.
Figure 11:
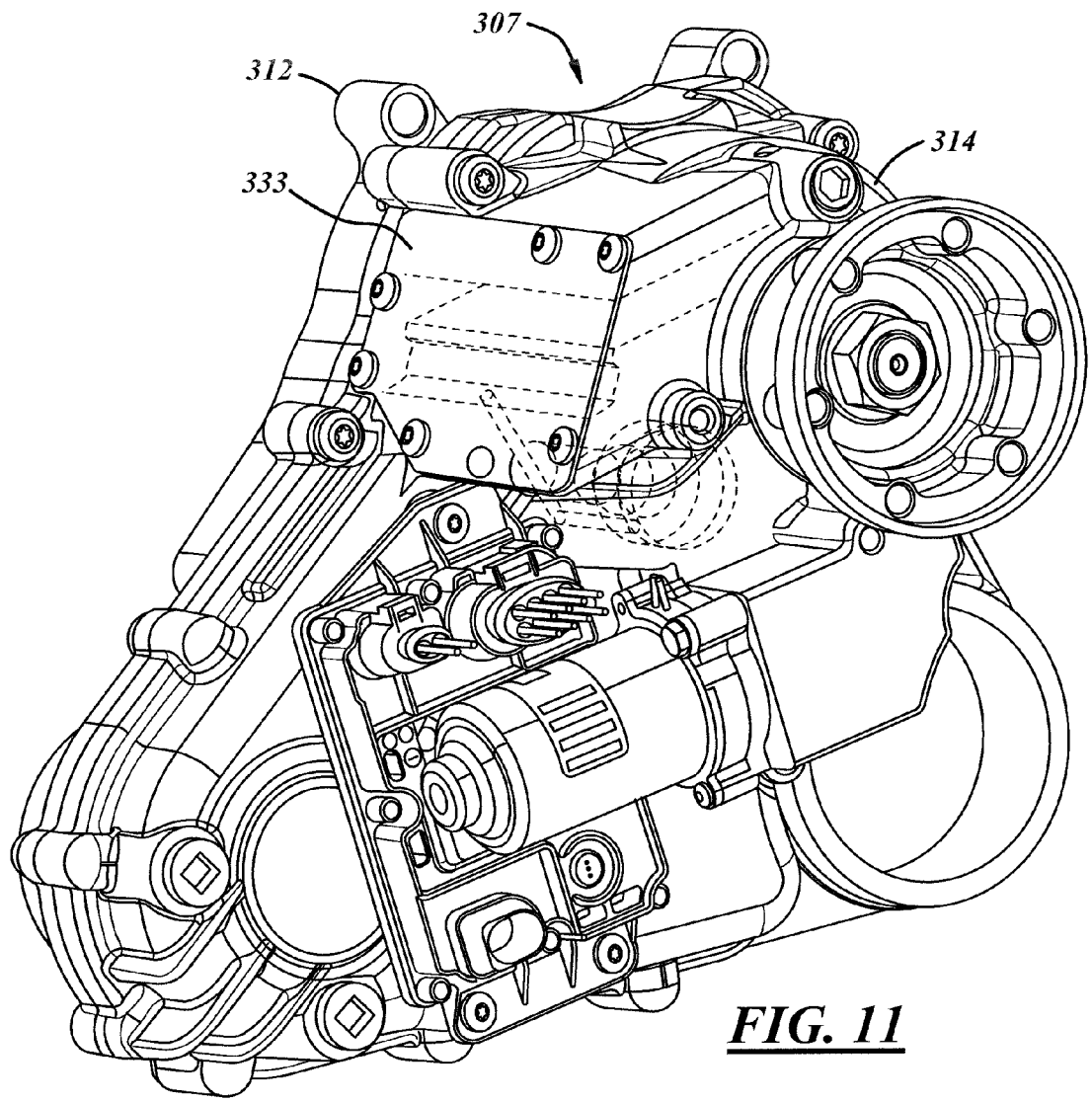
FIG. 11 is a rear perspective view of a transfer case shown in FIG. 10.
Figure 12:
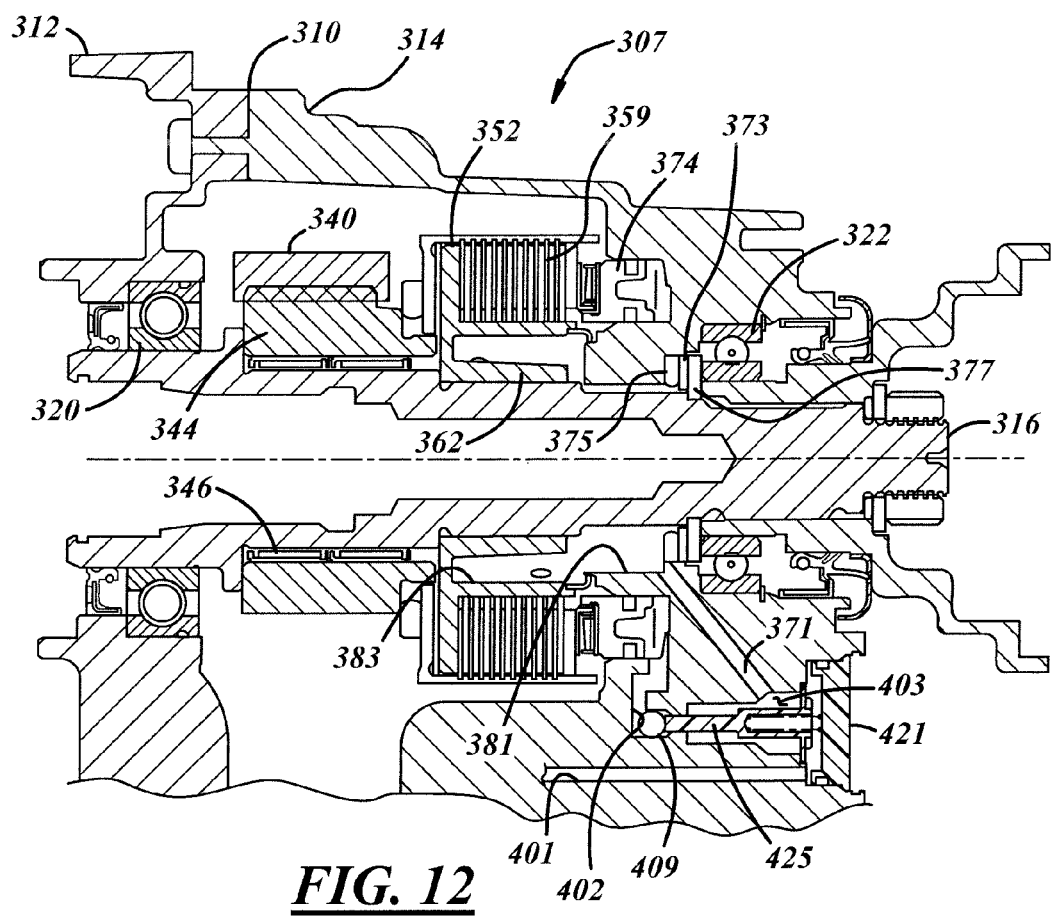
FIG. 12 is a sectional view taken primarily through the primary shaft of the transfer case shown in FIG. 10.
Figure 13:
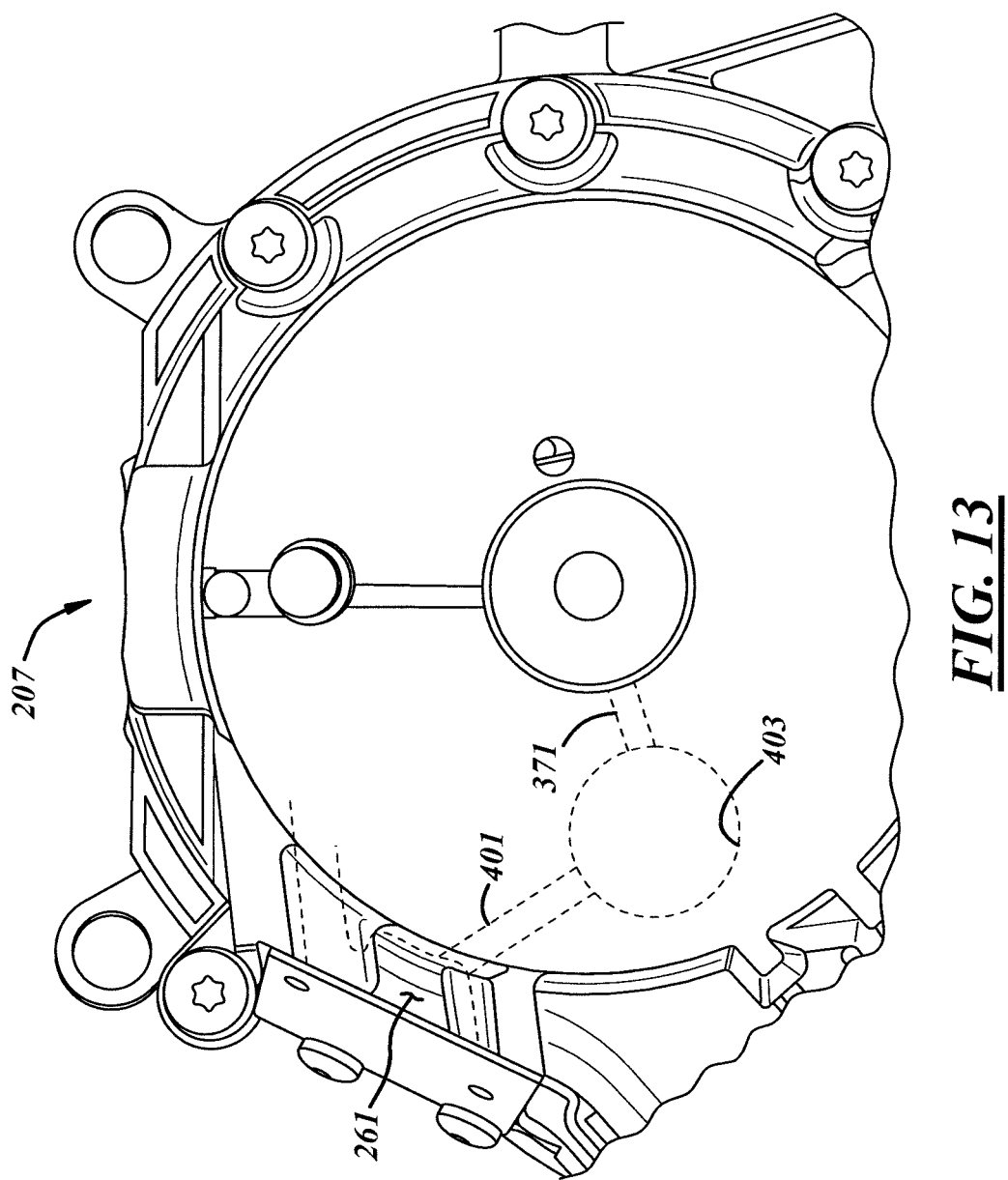
FIG. 13 is a partial section rear view of the transfer case shown in FIG. 10.
Figure 14:
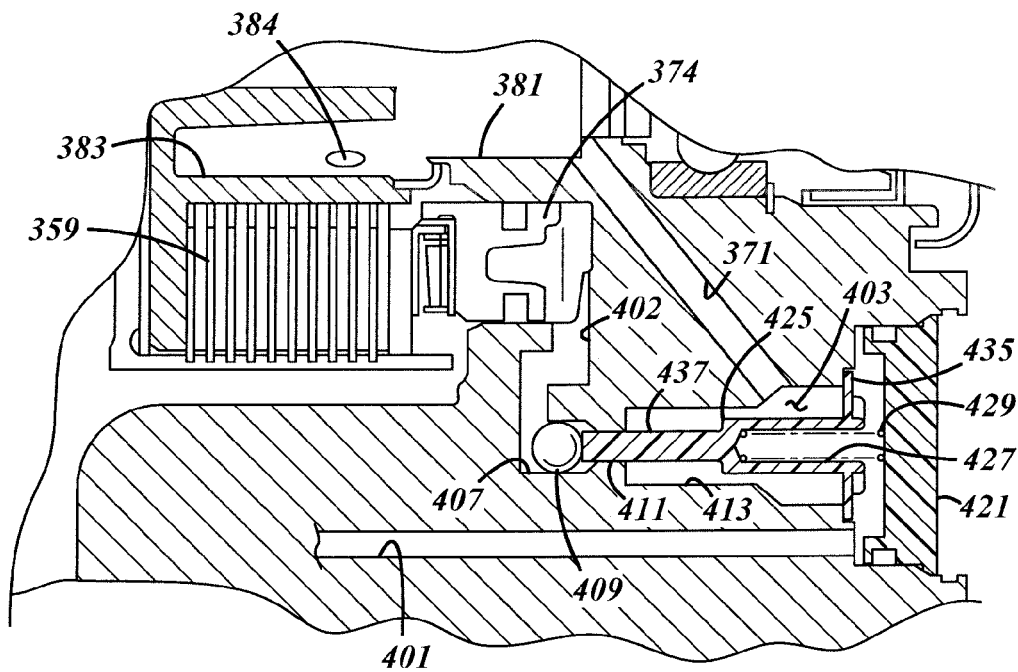
FIG. 14 is an enlarged section view illustrating a portion of the hydraulically actuated valve controlling fluid communication between the lubricant collection receptacle and the friction pack of the clutch.
Figure 15:
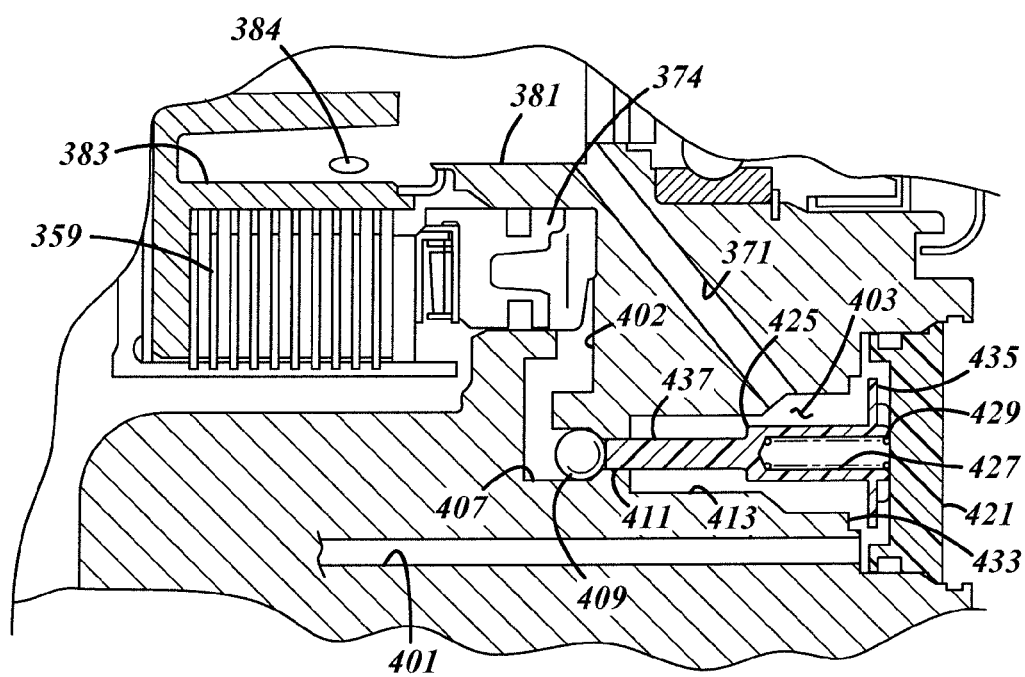
FIG. 15 is a view similar to that of FIG. 14 illustrating operation of the fluid actuated valve which controls fluid communication between the lubricant collection receptacle and the friction pack of the clutch of the transfer case shown in FIG. 10.

Referring to FIGS. 8 and 9, transfer case 247 according to the present invention can additionally be provided with an actively controlled lubricant collection receptacle 250 having an open top 252. The receptacle 250 can be a separate container, or a container formed in full or in part by the frame or other components of the transfer case. The open top gravitationally captures lubricant primarily splashed by the chain 253 (shown in phantom) and the upper sprocket (not shown) and by splash off of the casing walls. Receptacle 252 via a conduit 254 is connected with the bottom of a sump area 256 extending into the secondary shaft. Controlling the flow through the conduit 254 is a solenoid actuated valve shown schematically 258.

During normal operation or operation at slow speeds, spilled lubricant enters into retaining receptacle 250 to the top; over fill lubricant is allowed to flow into the sump to achieve a level within the sump 264. If the vehicle thereafter goes to a high level speed, in two wheel drive mode, (not needing any torque requirements for the clutch), valve 258 will shut, causing the receptacle 250 to fill up bringing the level of lubricant to that of 266 to avoid or minimize churning of fluid. Churning of lubricant can cause the generation of heat and undesired foaming. Control of the opening of valve 258 can be proportional and can be based upon the rotational speed or derivatives thereof of the secondary shaft which will be proportional generally to the speed of the vehicle. The control of solenoid valve 258 can also be a function of the torque demand placed upon the clutch of a vehicle transfer case. Higher torque demands will allow greater amounts of lubricant to be released by the valve 258. Typically, the control of the valve 258 will be a function of an electronic control unit.

Referring to FIGS. 10-15, an alternative preferred embodiment transfer case 307 according to the present invention is provided. The transfer case 307 has a housing 310 with a front cover 312 and a main body 314. Transfer case 307 has a primary shaft 316 rotatively mounted to the front cover plate 312 by a front bearing 320. Spline connected to the primary shaft 316 is a hub 362 that is connected to the primary shaft 316 in a manner as previously described and also having an axial extending lubrication passage 383 and is interfaced with the primary shaft 316 as previously described and also having a lubrication passage (not shown) similar to passage 114 (as described for hub 52 in FIG. 1).

Rotatably mounted on the primary shaft 316 by needle bearings 346 is a primary sprocket 344. Primary sprocket 344 is fixably connected with a clutch housing 352. The clutch housing 352 can be selectively engaged with the primary shaft 316 and hub 362 in a manner as previously described by virtue of a friction pack which can be selectively engaged by a hydraulically extruded piston 374. The front plate cover 312 has connected thereto a baffle 315. The baffle 315 is positioned generally adjacent to a chain 340 which transmits torque between a primary sprocket 344 and a secondary sprocket 338. Transfer case 307 also has a lower slack adjuster 363 which has extending there from two lubricant retainers 335. The lubricant retainers 335 function to help retain lubricant within the chain 340 as the chain 340 moves from the lower secondary sprocket 338 to the primary sprocket 344. The lubricant in normal usage being pooled in the bottom of the housing 310. The clutch housing 352 also has a series of axially spaced holes 353 to allow for the escape of lubricant in the friction pack beyond the clutch housing. The holes 353 are typically be on top of the radial folds 354 of the clutch housing.

As the chain 340 rotates, oil escapes the chain 340 and is diverted by baffle 315 an adjacent entrance of the reservoir system 329 oil also escapes the holes 353 and goes to the reservoir system 329. A lubricant collective fluid receptacle 361 is formed by the housing 314 on a side 331 of the housing opposite a side exposed to the clutch housing 352. A cover for the lubricant collection receptacle 361 is provided by a plate 333.

An axial needle bearing 373 (FIG. 12) is adjacent to thrust washers 375 and 377 which allow the housing to absorb the axial force caused by engagement of the clutch provided by the clutch housing 352 and the hub 362 into the primary shaft 316. The housing has a passage 401. The passage 401 has one end connected with the receptacle 361 forming a drain for the receptacle 361. The passage 401 has an opposite end that is connected with a multi-diameter chamber 403. Chamber 403 is connected with a passage 371 which is connected with a lubrication passage 381 which can deliver lubrication into a hub lubrication passage 383 which is axial which is intersected by hub radial passage 384 which can lubricate the friction pack 359 which is at the interface between the hub 362 and the clutch housing 352.

The chamber 403 has a first section 407 that has placed therein a ball 409. The first section 407 is fluidly connected with a passage 402. Passage 402 fluidly communicates with a control volume that pressurizes clutch apply piston 374. The chamber has a reduced section 411 that intersects an enlarged section 413. Section 413 intersects with passage 371 and passage 401. The chamber 403 is sealed by an end cap 421. Slidably mounted within the chamber 403 is a piston valve 425. The piston valve 425 has a bore 427 that mounts a coil spring 429. The coil spring 429 pushes the piston valve 425 towards the ball 409 causing a head 431 of the piston valve 425 to seat against a valve seat 433. An interior portion of the cap supports an extreme end of the coil spring 429. The spring 429 urges the piston valve 425 towards the ball 409 causing the head 431 to seal on the valve seat 433 thereby cutting off fluid communication from the passage 401 and collection receptacle 361 to the hub lubrication passage 383. Accordingly, under normal circumstances, the collection receptacle 361 will be fully filled, the overflow is then allowed to fall down to a sump of the transfer case. When the clutch 359 is engaged by the hydraulically powered piston 374, fluid pressure will build up within passage 402 forcing the ball 409 against a 437 stem of the piston valve 425. The above noted action will compress the spring 429 and dislodging the piston valve head 435 from the valve seat 433. Lubricant is now allowed to gravitationally flow to lubricate the friction pack 359 whenever the clutch is engaged.

Figure 16:
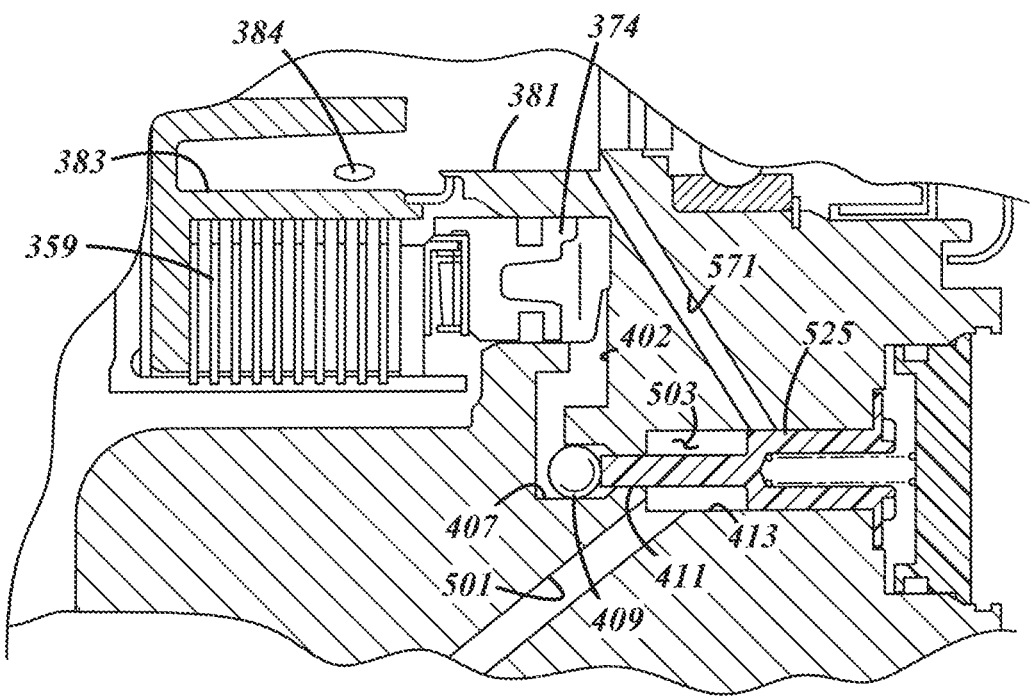
FIG. 16 is a view similar to FIG. 14 illustrating a valve that is an alternative to the valve shown in FIG. 14.
Figure 17:
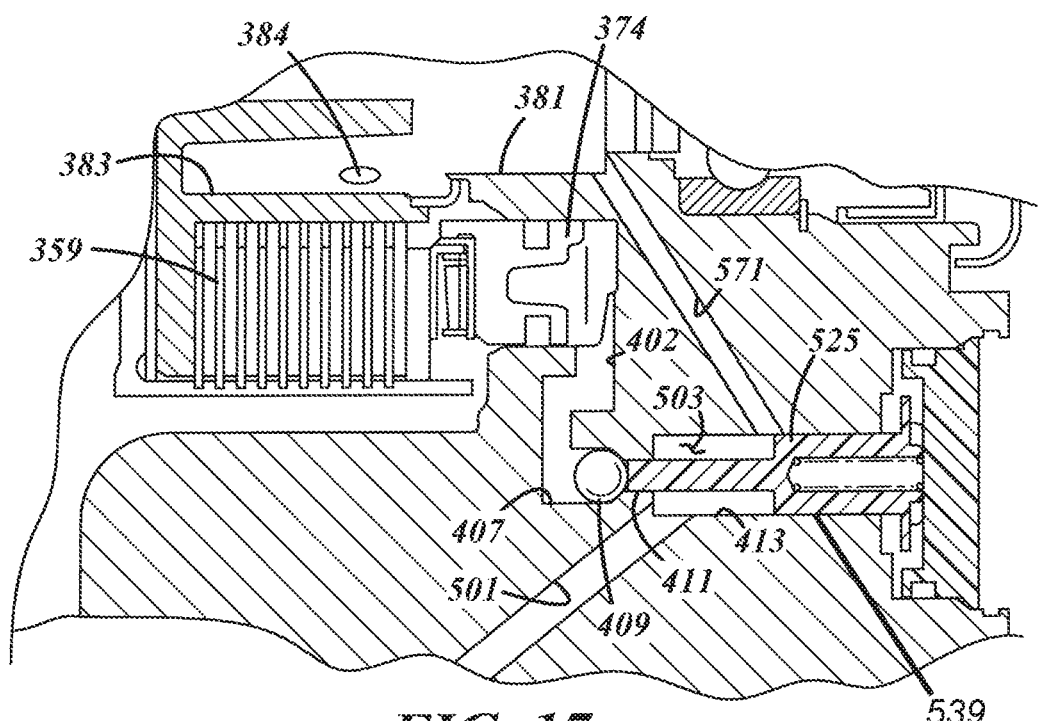
FIG. 17 is a view similar that that of FIG. 15 of the valve shown in FIG. 16.

FIGS. 16 and 17 show an alternative fluid actuated valve 525. Passage 501 directly connects to the receptacle 361 with chamber 503. Spring loaded valve 525 has a diametric side 539 that meter valves a passage 571. Passage 571 connects with passage 381. A stem of valve 525 is moved by the ball 409 upon activation of the clutch piston 374 in a manner as previously described for the valve 425.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle transfer case comprising:
a housing;
a primary shaft rotatably mounted within said housing, said primary shaft having a first sprocket selectively torsionally connected thereto by a clutch;
a secondary shaft rotatably mounted by said housing by a belt when said clutch is engaged via a second sprocket;
a lubricant collection receptacle positioned within said housing for gravitationally capturing lubricant splashed by said belt and said sprockets, said lubricant collection receptacle having a drain;
said drain being controlled by a valve;
wherein said valve opens a path between said lubricant collection receptacle and said clutch when a friction pack of said clutch is engaged; and
wherein said clutch friction pack is engaged by a hydraulically powered piston and said valve is hydraulically actuated to an open position.

2. The transfer case of claim 1 wherein said valve is a solenoid that controls flow there through based upon an angular speed or integral or derivative thereof of said secondary shaft.

3. The transfer case of claim 1 wherein said valve controls flow there through based upon a torque demand of said clutch.

4. The transfer case of claim 1 wherein lubricant released from said drain flows into said casing sump.

5. The vehicle transfer case of claim 1 wherein said clutch includes a hub connected with said primary shaft and a clutch housing torsionally connected with said first sprocket and said clutch is lubricated by lubricant gravitationally released from said drain and directed to an interface between said clutch hub and said clutch housing.

6. The vehicle transfer case of claim 1 wherein when said valve is opened hydraulically, said valve includes a piston that is lifted off of a valve seat.

7. The vehicle transfer case of claim 1 wherein there is a lubricant flow path along said primary shaft underneath said hub.

8. A vehicle transfer case for a normally rear wheel drive vehicle, said transfer case comprising:
a housing;
a primary shaft rotatably mounted in said housing;
a secondary shaft for powering a front differential of a vehicle, said secondary shaft being selectively driven by said primary shaft and being rotatably mounted within said housing;
a hub torsionally affixed with said primary shaft, said hub having an axially extending lubrication passage intersected by generally radial lubrication holes, said hub being fixably connected to said primary shaft and said hub having holes;
a clutch housing selectively torsionally connected with said hub via a friction pack;
a primary sprocket rotatably mounted upon said primary shaft and torsionally fixed with said clutch housing, said sprocket being engaged with a chain torsionally connecting said primary sprocket with said secondary shaft;
a hydraulically actuated piston for engaging such friction pack connecting said clutch housing with said hub;
a reservoir system fixed with respect to said housing for capturing lubricant energized resulting of the operation of said primary and secondary shafts, said reservoir system channeling lubricant to a lubricant collection receptacle;
a stationary passage formed in said housing for delivering lubricant from said lubricant collection receptacle radially inward of said friction pack to said hub lubricant passage; and
a valve positioned within said stationary passage hydraulically actuated and activated upon activation of said piston to allow lubricant to flow from said lubricant collection receptacle to said hub lubrication passage.

9. A vehicle transfer case as described in claim 8 wherein said valve lifts off a valve seat.

10. A vehicle transfer case as described in claim 8 wherein said valve has a diametric side that meters the flow of lubricant.

11. A vehicle transfer case for a normally rear wheel drive vehicle, said transfer case comprising:
a housing;
a primary shaft rotatably mounted in said housing;
a secondary shaft for powering a front differential of a vehicle, said secondary shaft being selectively driven by said primary shaft and being rotatably mounted within said housing;
a hub torsionally affixed with said primary shaft;
a clutch housing selectively torsionally connected with said hub via a friction pack;
a primary sprocket rotatably mounted upon said primary shaft and torsionally fixed with said clutch housing, said sprocket being engaged with a chain torsionally connecting said primary sprocket with said secondary shaft;
a hydraulically actuated piston for engaging such friction pack connecting said clutch housing with said hub;
a reservoir system fixed with respect to said housing for capturing lubricant energized resulting of the operation of said primary and secondary shafts, said reservoir system channeling lubricant to a lubricant collection receptacle;

a stationary passage formed in said housing for delivering lubricant from said lubricant collection receptacle to said friction pack to said hub lubricant passage; and a valve positioned within said stationary passage hydraulically actuated and activated upon activation of said piston to allow lubricant to flow from said lubricant collection receptacle to said friction pack.

12. A vehicle transfer case as described in claim 11 wherein said valve lifts off a valve seat.

13. A vehicle transfer case as described in claim 11 wherein said valve has a diametric side that meters the flow of lubricant.

* * * * *